United States Patent [19]
Nishiumi et al.

[11] Patent Number: 5,050,012
[45] Date of Patent: Sep. 17, 1991

[54] HIGH-SPEED ERASING APPARATUS FOR USE IN MAGNETIC RECORDING/REPRODUCING SYSTEM

[75] Inventors: Hiroshi Nishiumi, Kawasaki; Yasuomi Namiki, Yokohama, both of Japan

[73] Assignee: Victor Company of Japan, Ltd., Japan

[21] Appl. No.: 340,308

[22] Filed: Apr. 19, 1989

[30] Foreign Application Priority Data

Apr. 20, 1988 [JP] Japan .................................. 63-97513

[51] Int. Cl.⁵ ............................................... G11B 5/03
[52] U.S. Cl. ..................................................... 360/66
[58] Field of Search ......................................... 360/66

[56] References Cited

U.S. PATENT DOCUMENTS 4,527,202  7/1985  Ohta ........................................ 360/66
4,737,865  4/1988  Murakami et al. ...................... 360/66
4,750,060  6/1988  Nakazawa et al. ..................... 360/66

Primary Examiner—Vincent P. Canney
Attorney, Agent, or Firm—Lowe, Price, LeBlanc & Becker

[57] ABSTRACT

A high-speed erasing apparatus for use in a magnetic recording/reproducing system for erasing a recorded signal on a magnetic tape traveling along a predetermined path. The erasing apparatus comprises a flying-erasing head mounted on a rotary cylinder of the system, a full-erasing head disposed at a preceding position of the flying-erasing head in a traveling direction of the tape, and an audio-erasing head provided at a succeeding position thereof in the traveling direction. Also included in the apparatus are a high-speed erase oscillating circuit for supplying the full-erasing head with an output having a frequency higher than N times of the upper limit of the audible range, a video-erase oscillating circuit for supplying the flying-erasing head with an output having a frequency higher than the upper limit of a video signal range, and an audio-erase oscillating circuit for supplying the audio-erasing head with an output having a frequency higher than the upper limit of the audible range. The oscillating circuits are driven so that, at the initial time, the recorded signal is erased by all of the erasing heads with the tape being transported at the industry standard traveling speed and the high-speed erase oscillating circuit is operated so as to, after elapse of a predetermined time, erase the recorded signal by only the full-erasing head with the tape being transported at N times of the industry standard traveling speed.

2 Claims, 4 Drawing Sheets

HIGH-SPEED ERASING APPARATUS FOR USE IN MAGNETIC RECORDING/REPRODUCING SYSTEM

BACKGROUND OF THE INVENTION

The present invention relates generally to a high-speed erasing apparatus for use in helical scanning type magnetic recoding/reproducing systems such as a video tape recorder (VTR).

A helical-scanning type VTR is generally arranged to include a rotational cylinder, having at its circumferential portions a plurality of magnetic heads, around which a magentic tape is wound or wrapped obliquely so as to perform recording or reproducing of information on and from the magnetic tape by the magnetic heads in accordance with traveling of the magnetic tape concurrently with rotation of the rotational cylinder. Furthermore, known is a depth-recording type Hi-Fi VTR having on its rotational cylinder an audio head and a video head which are disposed to be close to each other. The depth-recording type Hi-Fi VTR is arranged such that an audio signal is recorded at a depth of a magnetic layer of the tape by the audio head and a video signal is further recorded (overwritten) over the recorded audio signal by the video head, whereby as shown in FIG. 5 the video signal and the audio signal are recorded successively along an oblique track T formed by the audio and video heads on the helically guided magnetic tape $T_P$ with a video signal segment of every field. In addition to the audio head 3 and the video head 2, the aforementioned VTR is provided with an audio signal recording fixed head which in turn records an audio signal on a side edge portion of the magnetic tape $T_P$ with it slidably contacting the traveling magentic tape $T_P$ so as to form an audio track $T_A$. Also included generally in the aforementioned VTR is a full-erasing head 1 for a full-tape width erasure of the magnetic tape $T_P$ which is adapted to erase the previously magnetic signals, before performing recording of a new signal on the magnetic tape $T_P$.

However, there is a problem which arises with such a VRT in that, because the full-width-erasing head 1 is disposed stationarily to take a preceding position to the video head 2 and the audio head 3 mounted on the rotational cylinder with respect to the tape travel direction, in the cases where the erasing operation is started upon determination of the erasing position determined from a reproduced picture image, a non-erased portion (shadowed portion in FIG. 5) is developed unintentionally between the position of a track recorded with the signal of the reproduced picture image and the full-erasing head 1, thereby resulting in the problem of incomplete erasure of the signal.

One conceivable solution for elimination of the presence of the non-erased portion left on the magentic tape $T_P$ is to set a recording condition without supplying the video signal and audio signal but with erasing signals to the video head 2 and the audio head 3 and let both heads carry on an erasing operation without using full erasing head. In this instance, it takes a longer time, i.e., the same time as normal signal recording operation, thus it would be unable to perform a high-speed erasing operation.

In addition, such a VTR is generally so arranged that the frequency of the erasing current to be supplied to the full-erasing head 1 is about five times (about 70 KHz) the upper limit of the audible frequency range. In this case another problem arises in that upon reproduction of the tape, the frequency of the erasing current is derived in the audible range as disturbing noises.

SUMMARY OF THE INVENTION

The present invention has been developed in order to remove the drawbacks inherent to the conventional high-speed erasing apparatus for magnetic recording/reproducing system.

It is therefore an object of the present invention is to provide a high-speed erasing apparatus for use in a magentic recording/reproducing system which does not produce the non-erased portion and which is capable of eliminating the frequency component of the erasing current on reproduction.

With this and other objects which will become apparent as the description proceeds, a high-speed erasing apparatus for use in a magnetic recording/reproducing system according to the present invention includes a flying-erasing head mounted on a rotational cylinder of the magnetic recording/reproducing system, a full-erasing head disposed at a preceding position of the flying-erasing head with respect to a traveling direction of a magnetic tape, and an audio-erasing head provided at a succeeding position of the flying-erasing head with respect to the traveling direction of the magnetic tape which is transported to be wrapped around the rotational cylinder in contact relation to the respective erasing heads. The apparatus further includes a high-speed erase oscillating circuit for supplying the full-erasing head with an oscillator output having a frequency higher than N times is the upper limit of the audible range where N is a positive number, a video-erase oscillating circuit for supplying the flying-erasing head with an oscillator output having a frequency higher than the upper limit of a carrier frequency range of a video signal, and an audio-erase oscillating circuit for supplying the audio-erasing head with an oscillator output having a frequency higher than the upper limit of the audible range. Also included in the apparatus is a control circuit coupled to the oscillating circuits, the control circuit for causing the oscillating circuits to be controlled so that, at the initial state of the erasing operation, the recorded signals are erased by means of all the erasing heads with the magnetic tape being transported at the industry standard traveling speed and then causing the high-speed erase oscillating circuit to be driven so that, after elapse of a predetermined time, the recorded signals are erased by only the full-erasing head with the magnetic tape being driven at a speed changed to N times the industry standard traveling speed.

Preferably, the high-speed erase oscillating circuit comprises a first oscillator which generates a first output having a first frequency, a second oscillator which generates a second output having a second frequency different from the first frequency and a switching circuit coupled to the first and second oscillators for performing a switching operation between the first and second outputs of the first and second oscillators, either the first or second output thereof being supplied as the oscillation output of the high-speed oscillating circuit to the full-erasing head in accordance with the switching operation of the switching circuit which is under control of the control circuit.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
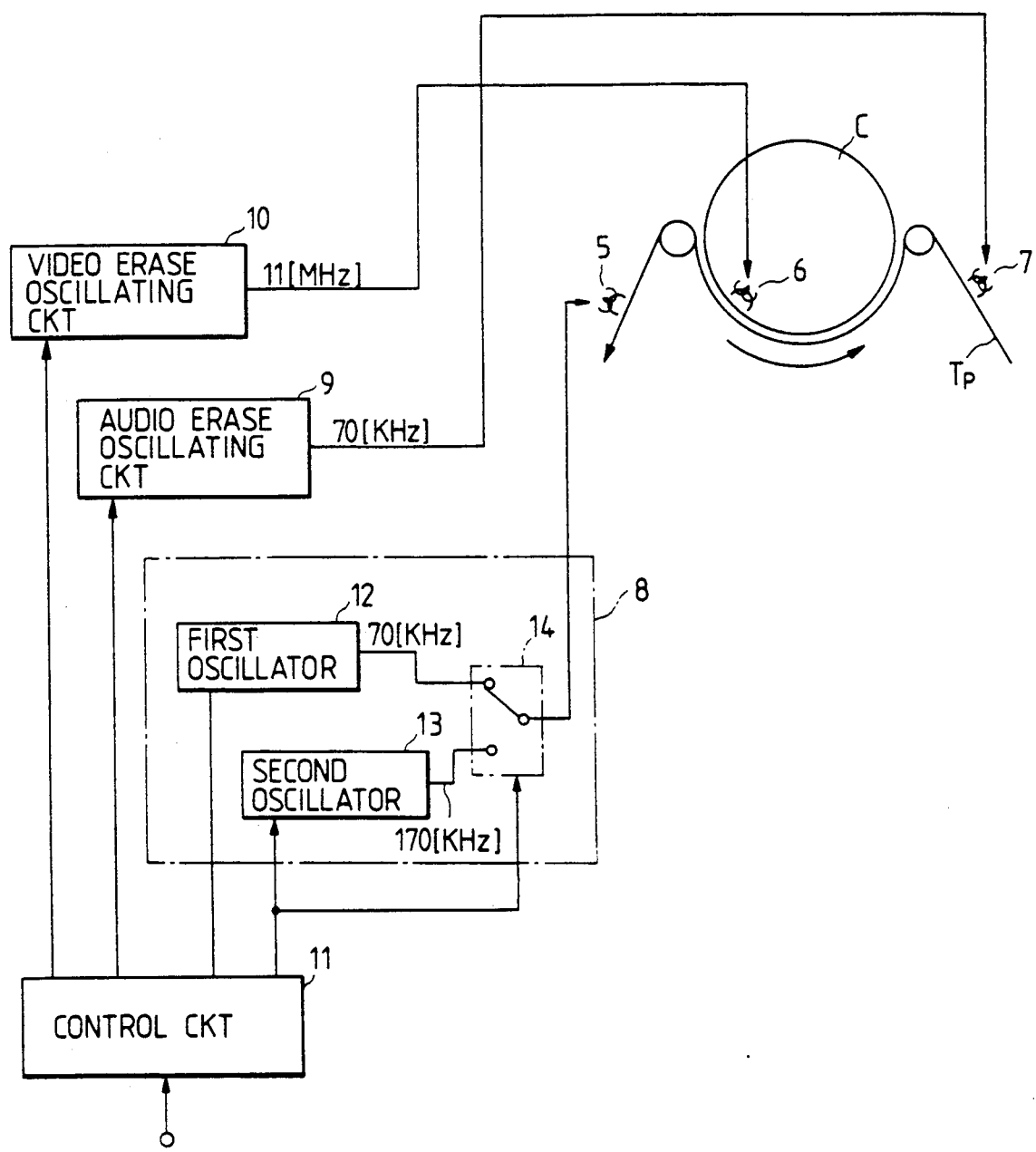
FIG. 1 is a block diagram showing an high-speed erasing apparatus according to an embodiment of the present invention.
Figure 2:
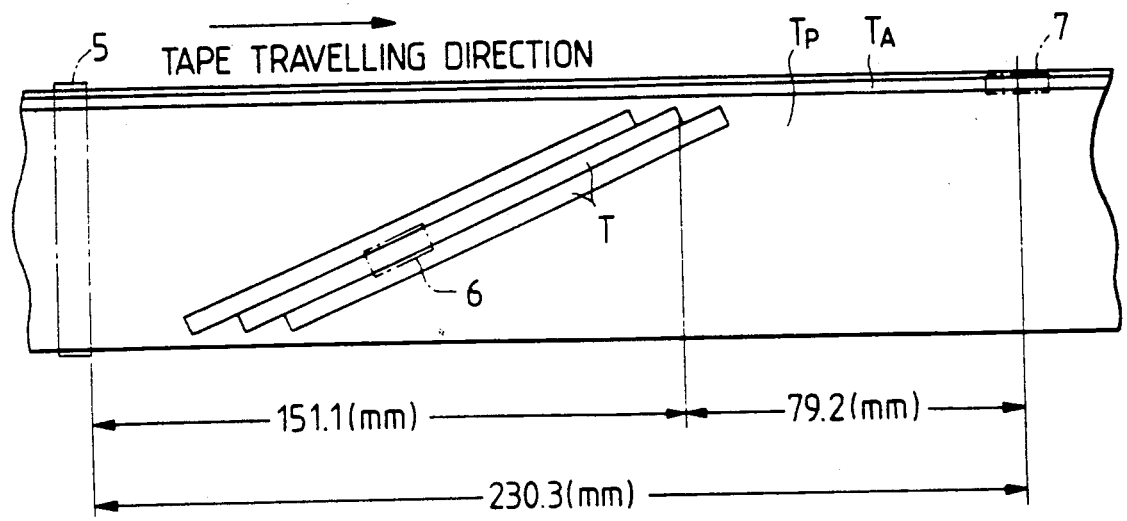
FIG. 2 is an illustration for describing the relation in position on a magnetic tape between the respective erasing heads of the FIG. 1 high-speed erasing apparatus.
Figure 5:
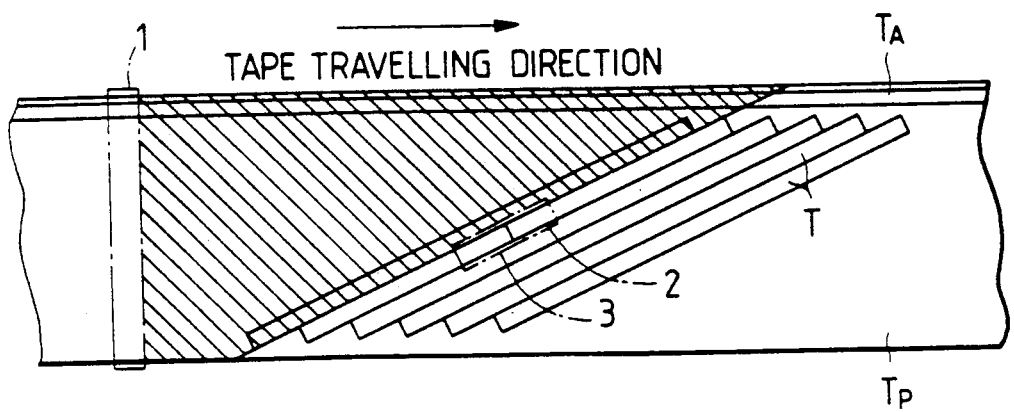
FIG. 5 shows a general track pattern and the positions of heads therefor.

Referring now to FIG. 1, there is schematically illustrated the arrangement of a high-speed erasing apparatus for magnetic recording/reproducing system according to an embodiment of the present invention. In FIG. 1, the high-speed erasing apparatus is adapted to perform a high-speed erasing operation with a magnetic tape $T_P$ traveling at a high speed ten times as high as a regular tape traveling speed (one of the industry standard speeds for example, 3.34 cm/sec) on reproduction or on recording. The arrangement comprises a full-erasing head 5, a flying-erasing head 6 and an audio-erasing head 7. The flying-erasing head 6 is mounted on a rotational cylinder C so as to contact with the magnetic tape $T_P$ wrapped around the rotational cylinder C, and the full-erasing head 5 and audio-erasing head 7 are respectively positioned stationary at the outside of the rotational cylinder C. These erasing heads 5, 6 and 7, as will be apparent from FIG. 1 or 2, are disposed in sequence to come into contact with the magnetic tape $T_P$ traveling in a predetermined direction. The high-speed erasing apparatus is further provided with a high-speed erase oscillating circuit 8, an audio erase oscillating circuit 9 and a video erase oscillating circuit 10 which are in turn. under control of a control circuit 11. The audio erase oscillator circuit 9 supplies the audio-erasing head 7 with an oscillation output (erasing current) having a frequency of about 70 KHz which is about five times the upper limit of the audible range, and the video erase oscillating circuit 10 supplies the flying-erasing head 6 with an oscillation output having a frequency of about 11 MHz which is above the frequency range of the video signal to be recorded or reproduced. On the other hand, the high-speed erase oscillating circuit 8 comprises a first oscillator 12 for generating an output having a frequency of about 70 KHz, a second oscillator 13 for generating an output having a frequency of about 170 KHz which is higher than ten times the upper limit of the audible range, and a switching circuit 14 for selectively performing a switching operation between the first and second oscillators 12 and 13 so as to supply either the oscillation output of the first oscillator 12 or the oscillation output of the second oscillator 13 to the full-erasing head 5. The first and second oscillators 12, 13 and the switching circuit 14 are driven under control of the control circuit 11.

Figure 3:
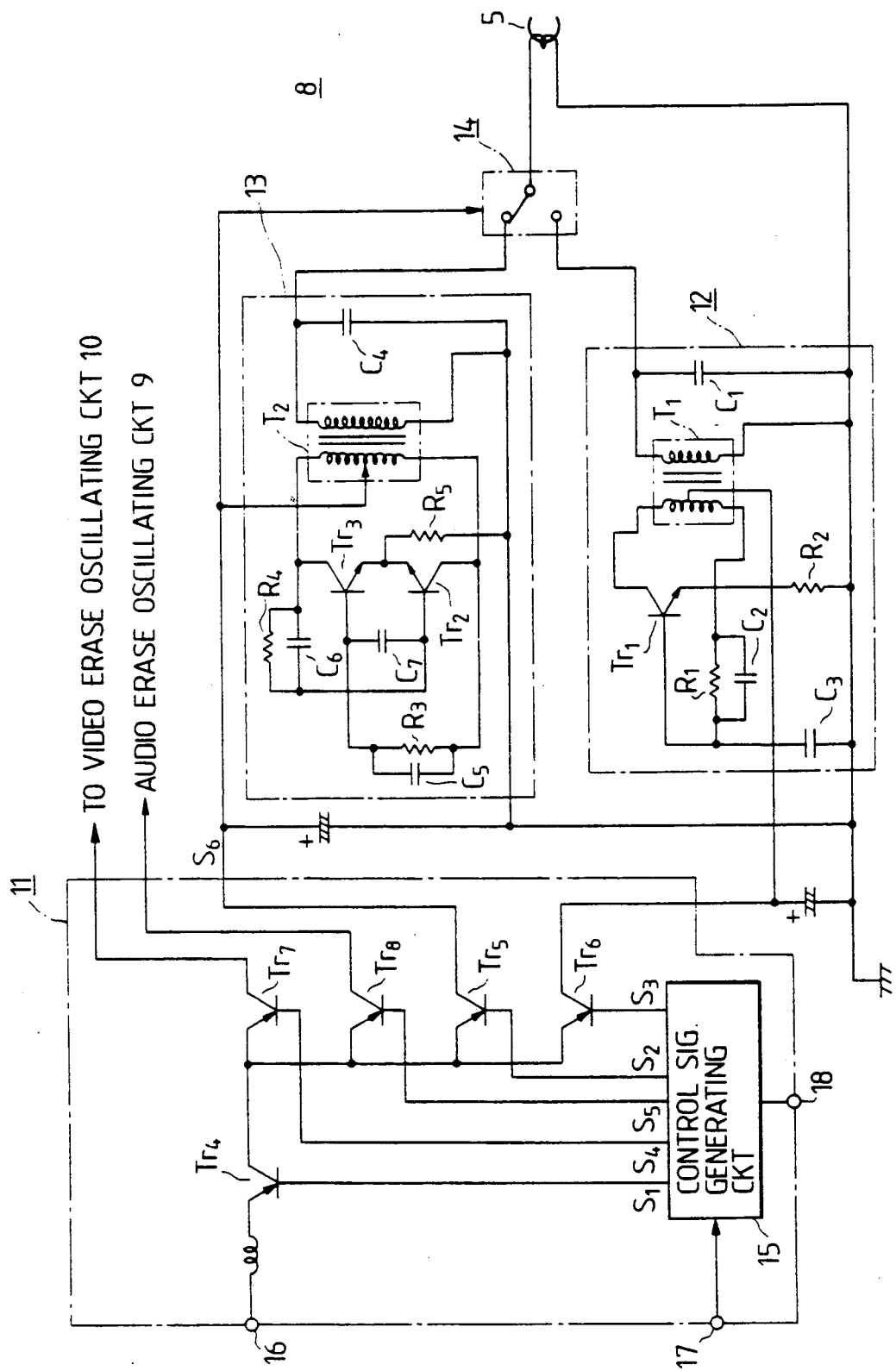
FIG. 3 is a circuit diagram illustrating a circuit arrangement of the FIG. 1 high-speed erasing apparatus.

FIG. 3 shows detailed arrangements of the high-speed erase oscillating circuit 8 and the control circuit 11. The first oscillator 12 of the high-speed erase oscillating circuit 8 comprises a blocking oscillating circuit equipped with a transformer T1 for oscillation, transistor Tr1 and a capacitor C1. The primary coil of the transformer T1 receives a power supply current through a midpoint tap and one end thereof is coupled to the base of the transistor Tr1 through a time-constant circuit comprising a capacitor C2 and a resistor R1 and further grounded through a capacitor C3. The other end of the primary coil thereof is connected to the collector of the transistor Tr1. One end of the secondary coil of the transformer T1 is grounded and the other end thereof is coupled to the switching circuit 14 so as to form a signal line through which the output of the first oscillator 12 is supplied to the switching circuit 14.

The capacitor C1 is disposed between both the ends of the secondary coil of the transformer T1, and the capacity of the capacitor C1 and the inductance of the transformer T1 are determined so that the oscillation frequency of the or 12 is about 70 KHz being five times the first oscillator 12 is about 70 KHz being five times the upper limit (generally, about 15 KHz) of the audible range. Furthermore, the second oscillator 13, as well as the first oscillator 12, is provided with a transformer T2 for oscillation, two transistors Tr2, Tr3 making up an astable multivibrator, and with a capacitor C4. The primary coil of the transformer T2 receives a power supply current through a midpoint tap and one end thereof is connected to the collector of the transistor Tr2 and further connected to base of the transistor Tr3 through a time-constant circuit comprising a capacitor C5 and a resistor R3. On the other hand, the other end of the primary coil is coupled to the collector of the transistor Tr3 and further coupled to the base of the transistor Tr2 through a time-constant circuit comprising a capacitor C6 and a resistor R4. Here, the emitters of the transistors Tr2 and Tr3 are grounded through a resistor R5 and the bases of the transistors Tr2 and Tr3 are coupled to each other through a capacitor C7.

One end of the secondary coil of the transformer T2 is grounded and the other end thereof is coupled to the switching circuit 14 so as to form a signal line through which the oscillation output of the second oscillator 13 is supplied to the switching circuit 14. In addition, the capacitor C4 is disposed between both the ends of the secondary coil thereof, and in this embodiment the capacity of the capacitor C4 and the inductance of the transformer T2 are appropriately determined so that the oscillation frequency of the second oscillator 13 becomes about 170 KHz which is over ten times the upper limit of the audible range.

Here, in the case where that the ten-times speed erasure is performed with the oscillation output of the second oscillator 13, when the erased portion is reproduced at a regular tape traveling speed (one of the industry standard speeds) the frequency of the reproduction output falls within the carrier frequency range of a recorded FM-modulated luminance signal, the reproduction output component of the erasing current appears as noise on the reproduced picture image. Therefore, it is preferable that the oscillation output of the second oscillator 13 is determined so that the frequency of the reproduction output is out of the carrier frequency range. That is, in cases where the ten-time speed erasure is effected under the conditions that the carrier range of the FM modulated luminance signal is 3.4 to 4.4 MHz, the relative speed of the video head with respect to the magnetic tape $T_P$ is 5.8 m/sec and the regular tape traveling speed is 3.34 cm/sec, the recorded wavelength of the FM-modulated luminance signal to be recorded on the magnetic tape $T_P$ becomes 1.71 [micrometer](5.8 divided by $3.4 \times 10^6$ to 1.32 [micrometers](5.8 divided by $4.4 \times 10^6$), and therefore, the frequency of the erasing current on the high-speed erase is set to be below 195 [KHz]($3.34 \times 10^{-2} \times 10$ divided by $1.71 \times 10^{-6}$) or be above 253 [KHz]($3.34 \times 10^{-2} \times 10$ divided by $1.32 \times 10^{-6}$).

Furthermore, the the oscillation frequency of the second oscillator 13 is required to be set to be above 150 [KHz]($15 \times 10$) so that the frequency of the reproduction output on reproduction of the ten-times high-speed erased portion becomes out of the audible range (about 20 Hz to 15 KHz). Thus, the oscillation frequency of the second oscillator 13 in performing the ten-times high-speed erasure may be set to a value which satisfy the above-mentioned conditions, i.e., a value (for example, 170 KHz) which is above 150 KHz and below 195 KHz.

On the other hand, the control circuit 11 includes first to fifth transistors Tr4, Tr5, Tr6, Tr7 and Tr8 and a control signal generating circuit 15. The first transistor Tr4 is coupled in series to the other transistors Tr5 to Tr8, as shown in FIG. 3, so as to turn on and off power supply lines between a power supply terminal 16 coupled to a power supply of 12 V and the respective oscillating circuits 9, 10, 12 and 13. From the control signal generating circuit 15 to the respective bases of the first to fifth transistors Tr4 to Tr8 are supplied first to fifth control signal S1 to S5 as illustrated by (A) to (E) in FIG. 4. The respective transistors Tr4 to Tr8 are on-off-controlled in response to these control signals Sl to S5, whereby the respective oscillators 9, 10, 12 and 13 are driven accordingly. Here, control signal generating circuit 15 produces the first to fifth control signals Sl to S5 in accordance with a mode signal supplied thereto through an input terminal 17.

Figure 4:
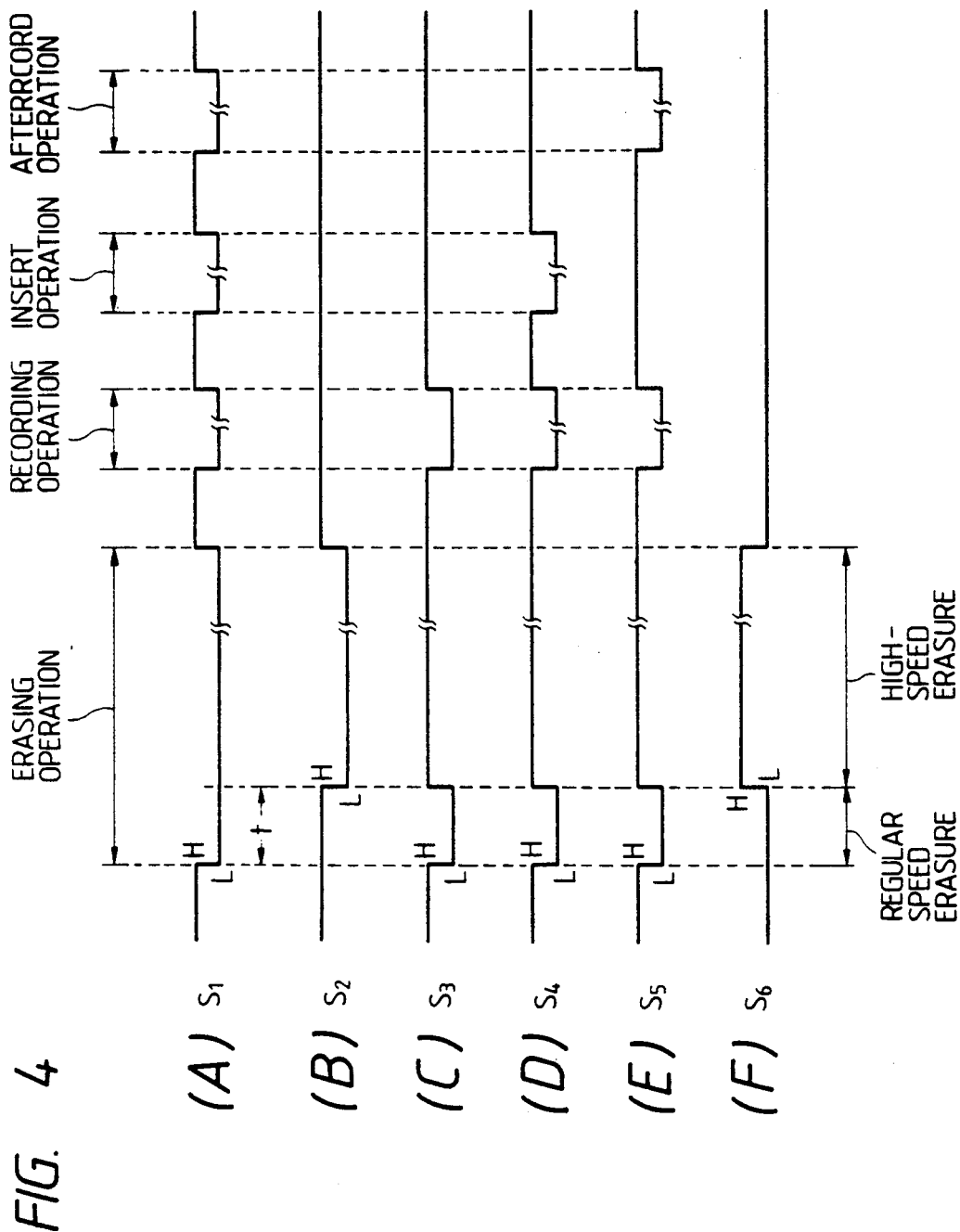
FIG. 4 is a time chart for describing operation of the FIG. 1 high-speed erasing apparatus.

Furthermore, in this embodiment the output of the second transistor Tr5 is a switching control signal S6 illustrated by (F) in FIG. 4, which is in turn supplied to the switching circuit 14. When the switching control signal S6 is in the low-level state, the oscillation output of the first oscillator 12 is supplied to the full-erasing head 5, and whencoming to the high-level state, the oscillation output of the second oscillator 13 is supplied thereto.

A description will be given hereinbelow in terms of high-speed erase operation of the above-mentioned high-speed erasing apparatus. In response to a start of the high-speed erasing operation, the magentic tape $T_P$ is driven initially at a regular traveling speed by means of a drive mechanism, not shown, and the control signals Sl, S3, S4 and S5 shown by (A), (C), (D) and (E), which are generated by the control signal generating circuit in response to a high-speed erase mode signal inputted to the input terminal 17, respectively enter in the low-level states whereby the first, third, fourth and fifth transistors Tr4, Tr6, Tr7 and Tr8 are set to ON-states, respectively. Thus, a power supply current from the power supply terminal 16 is applied to the first oscillator 12 of the high-speed erase oscillating circuit 8, audio erase oscillating circuit 9 and video erase oscillating circuit 10, respectively. In response to the power supply current, the oscillating circuits 12, 9 and 10 are driven so as to generate the oscillation outputs which are in turn supplied to the full-erasing head 5, audio-erasing head 7 and flying-erasing head 6, respectively. Here, at this time, the second transistor Tr5 is in the OFF-state, and the switching control signal S6 is in the low-level state as shown by (F) in FIG. 4.

After elapse of a predetermined time t, when the erased portion due to the full-erasing head 5 reaches, the position of the audio-erasing head 7, the traveling speed of the magentic tape $T_P$ is automatically switched to ten times the regular traveling speed by the drive mechanism in response to a tape speed control signal generated in correspondence with the predetermined time t by the control signal generating circuit 15 and supplied to the drive mechanism through a terminal 18 in FIG. 3. At the same time, as shown in FIG. 4, the control signal S2 changes from the high-level state to the low-level state, the switching control signal S6 varies from the low-level state to the high-level state, and further the control signals S3 to S5 change from the low-level states to the high-level states, respectively. Therefore, the third to fifth transistors Tr6 to Tr8 are turned off and the second transistor Tr5 is turned on, whereby the power supply current from the power supply terminal 16 is supplied to the second oscillator 13 of the high-speed erase oscillating circuit 8 and to the switching circuit 14 to make the latter to be activated so that the oscillation output of the second oscillator 13 is supplied to the full-erasing head 5.

Thereafter, such high-speed erasing operation continues and, in response to termination of the erase, the control signals S1 to S5 change to the high-level states and the switching control signal S6 enters in the low-level state. Here, the predetermined time t is about 7 seconds under the conditions that the regular tape traveling speed is 3.34 cm/sec and the distance on the magnetic tape $T_P$ from the full-erasing head 5 to the audio-erasing head 7 is 230.3 mm. Furthermore, in the case of reproduction with so-called three-times recording and play time mode, since the tape traveling speed becomes ⅓ of the regular traveling speed, the predetermined time t becomes about 21 seconds (7 sec×3).

On the other hand, in the case of performing the regular recording by the above-mentioned high-speed erasing apparatus, as shown in FIG. 4, the first and third to fifth control signals S1, S3 to S5 are respectively set to be in the low-level states, and the oscillation outputs of about 70 KHz from the first oscillator 12 of the high-speed erase oscillating circuit 8 and from the audio erase oscillating circuit 9 are supplied to the full-erasing head 5 and the audio-erasing head 7 respectively, and the oscillation output of about 11 MHz from the video erase oscillating circuit 10 is supplied to the flying-erasing head 6. In addition, for insert edit (a part of track or tracks is overrecorded with a new signal replacing the previously recorded portion by simultaneously erasing thereof) of a video signal, only the first and fourth control signals S1 and S4 enter in the low-level states and only the flying-erasing head 6 performs the erasing operation. On the other hand, for after recording operation with an audio signal, only the first and fifth control signals S1 and S5 become to the low-level states and only the audio-erasing head 7 becomes the erasing state.

As described above, in the high-speed erasing apparatus according to this embodiment, high-speed erasure can be performed without developing or leaving non-erased portions by cleverly controlling the tape transport speed, the full-erasing head 5, flying erasing head 6 and audio-erasing head 7. In addition, since the frequency of the erasing current for the high-speed erasing operation is set to be 170 KHz, in the case that the high-speed-erased portion is reproduced at the regular speed, the reproduction output component of the erasing current becomes above the upper limit of the audible range and below the carrier range of a FM-modulated luminance signal, and therefore the reproduction output component does not cause noise and does not appear as noise on the reproducted picture image. Furthermore, although the power consumption of the second oscillator 13 in which oscillation is effected with a relative high frequency is greater as compared with that of the first oscillator 12, since the second oscillator 13 is driven only in the high-speed erasing mode, it is possible to significantly save power as compared with the condition that the second oscillator 13 is always kept operated. Furthermore, although in this embodiment oscillation of about 170 KHz is made by using a power supply of 12 V and hence the voltage at both ends of the secondary coil of the transformer T2 of the second oscillator 13 reaches 120 Vp-p, since the transistors Tr2 and Tr3 of the primary coil thereof is used so as to form a two-step arrangement, it is possible to prevent these transistors Tr2 and Tr3 from being damaged, thereby resulting in improving the reliability of the high-speed erasing apparatus.

Furthermore, although in this embodiment the audio erase oscillating circuit 9 and the first oscillator 12 are provided separately, it is also possible that a single oscillating circuit which generates an oscillation output of about 70 KHz is used for both the audio-erasing head 7 and full-erasing head 5. In addition, although in this embodiment the frequency of the erasing current for erasing operation is switched between 70 KHz and 170 KHz, however, for the high-speed erase operation, only the erasing current only for the regular speed erasure.

It should be understood that the foregoing relates to only a preferred embodiment of the present invention, and that it is intended to cover all changes and modifications of the embodiment of this invention herein used for the purposes of the disclosure, which do not constitute departures from the spirit and scope of the invention.

What is claimed is:

1. A high-speed erasing apparatus for use in a magnetic recording/reproducing system for erasing recorded signals including a video signal and an audio signal in an audible frequency range on a magentic tape with said magnetic tape being transported by drive means at N times as high as an industry standard travelling speed of said magentic tape where N is a positive number, said magnetic recording/reproducing system including a rotational cylinder around which said magentic tape is wrapped, said high-speed erasing apparatus comprising:

erasing head means comprising a flying-erasing head mounted on said rotational cylinder, a full-erasing head provided at a preceding position of said flying-erasing head with respect to a travelling direction of said magnetic tape, and an audio-erasing head provided at a succeeding position of said flying-erasing head with respect to said travelling direction of said magentic tape, said magentic tape travelling in contact relation to said erasing head means;

a high-speed erase oscillating circuit for supplying said full-erasing head with an oscillation output having a frequency higher than N times an upper limit of the audible frequency range;

a video-erase oscillating circuit for supplying said flying-erasing head with an oscillation output having a frequency higher than an upper limit of a carrier frequency range of the video signal;

an audio-erase oscillating circuit for supplying said audio-erasing head with an oscillation output having a frequency higher than the upper limit of the audible range; and a control circuit coupled to said drive means and said oscillating circuits, for causing said oscillating circuits and said drive means being controlled so that, at an initial state, the recorded signals are erased by said erasing head means with said magnetic tape being transported at the industry standard travelling speed and for subsequently causing after elapse of a predetermined time, said high-speed erase oscillating circuit and said drive means being controlled that the recorded signals are erased by only said full-erasing head with said magentic tape being transported at a speed changed to N times the industry standard travelling speed.

2. A high-speed erasing apparatus as claimed in claim 1, wherein said high-speed erase oscillating circuit comprises a first oscillator which generates a first output having a first frequency, a second oscillator which generates a second output having a second frequency different from said first frequency and a switching circuit coupled to said first and second oscillators for performing a switching operation between said first and second outputs of said first and second oscillators, either said first or second output thereof being supplied as the oscillation output of said high-speed oscillating circuit to said full-erasing head in accordance with the switching operation of said switching circuit which is under control of said control circuit.

* * * * *